United States Patent
Khan et al.

(10) Patent No.: US 7,121,606 B2
(45) Date of Patent: Oct. 17, 2006

(54) VEHICLE STORAGE STRUCTURE

(75) Inventors: Moonis F. Khan, Garnd Blanc, MI (US); Randy Johnson, White Lake, MI (US); Sharad Kulkarni, Farmington Hills, MI (US)

(73) Assignee: Nissan Technical Center North America, Inc., MI (US)

(*) Notice: Subject to any disclaimer, the term of this patent is extended or adjusted under 35 U.S.C. 154(b) by 0 days.

(21) Appl. No.: 11/055,110

(22) Filed: Feb. 11, 2005

(65) Prior Publication Data

US 2006/0181103 A1    Aug. 17, 2006

(51) Int. Cl.
*B60R 7/04* (2006.01)

(52) U.S. Cl. ............................. 296/37.15; 297/188.1; 224/275

(58) Field of Classification Search ............. 296/37.15; 297/188.1; 224/275; 220/255
See application file for complete search history.

(56) References Cited

U.S. PATENT DOCUMENTS

| | | | |
|---|---|---|---|
| 1,404,484 A * | 1/1922 | Schoonmaker ........... 296/37.15 |
| 3,614,136 A * | 10/1971 | Dent ........................ 280/500 |
| 5,096,249 A | 3/1992 | Hines | |
| 5,249,724 A | 10/1993 | Green | |
| 5,558,386 A | 9/1996 | Tilly et al. | |
| 5,667,115 A * | 9/1997 | Verhaeg ...................... 224/275 |
| 5,902,009 A | 5/1999 | Singh et al. | |
| 6,106,044 A | 8/2000 | Schlachter | |
| 6,386,612 B1 * | 5/2002 | Hofmann et al. ........ 296/37.15 |
| 6,390,547 B1 * | 5/2002 | Spykerman .............. 297/188.1 |
| 6,488,327 B1 * | 12/2002 | Pearse et al. ............. 296/65.05 |
| 6,644,523 B1 * | 11/2003 | Salas ........................ 224/275 |
| 6,824,029 B1 * | 11/2004 | Tuel et al. ................. 224/275 |
| 6,837,531 B1 * | 1/2005 | Mack et al. ............. 296/65.09 |
| 6,877,807 B1 * | 4/2005 | Mizuno et al. .......... 297/188.1 |

* cited by examiner

*Primary Examiner*—Dennis H. Pedder
(74) *Attorney, Agent, or Firm*—Global IP Counselors, LLP (57) ABSTRACT

A vehicle storage structure includes a removable storage structure that is secured to a passenger compartment floor of a passenger vehicle. A first compartment lid is movably supported on the storage structure to move between an open position and a closed position. A seat is operably fixed to the passenger compartment floor with at least a first seat portion of the seat being movable between a compartment lid covering position and a compartment lid exposing position. The first compartment lid is movable from the closed position to the open position when the first seat portion is in the compartment lid exposing position.

21 Claims, 10 Drawing Sheets

VEHICLE STORAGE STRUCTURE

BACKGROUND OF THE INVENTION

1. Field of the Invention

The present invention generally relates to a vehicle storage structure. More specifically, the present invention relates to a vehicle storage structure that is concealed under a passenger seat within a passenger vehicle.

2. Background Information

Most passenger vehicles have unused space beneath passenger seats within the vehicle. In some vehicles, such as sedans, station wagons, sport utility vehicles and vans, the area under the passenger seats is empty space that is either too small to use for storage or may not have accessibility for use as a storage or cargo space. Attempts have been made to utilize the space under a passenger seat in vehicles. However, these attempts have some disadvantages.

For example, U.S. Pat. No. 6,106,044 to Schlachter and U.S. Pat. No. 5,902,009 Singh et al. each disclose a vehicle that includes several passenger seats. One of the passenger seats has a bench seat with room for three passengers. The space under the bench seat is configured to form a storage area that is accessed by lifting the bench seat. One problem with the configurations disclosed in both Schlachter and Singh et al. is that the entire bench seat must be lifted to access the storage area. The bench is long and appears to be difficult to manipulate. Further, seated passengers must first leave the bench before the storage area can be accessed. Therefore, the storage area is not accessible by the passengers while in the car. Another disadvantage is that the storage area is defined by uneven contours on the floor surface beneath the bench seat. The storage space therefore has limited usefulness.

In view of the above, it will be apparent to those skilled in the art from this disclosure that there exists a need for an improved storage compartment in the space under passenger seats. This invention addresses this need in the art as well as other needs, which will become apparent to those skilled in the art from this disclosure.

SUMMARY OF THE INVENTION

It has been discovered that with some vehicle designs, the space under a passenger seat within a vehicle can be useful for storing small articles or small cargo. In order to take advantage of this useful space, a storage box can be constructed and removably installed under the passenger seat. One object of the present invention is to provide a removable storage compartment or storage box installed under one of the passenger seats of a passenger vehicle.

In accordance with one aspect of the invention, a vehicle body structure is provided that basically comprises a passenger compartment floor, a storage structure, a first compartment lid, and a passenger seat. The storage structure is secured to the passenger compartment floor. The first compartment lid is movably supported on the storage structure to move between an open position and a closed position. The seat is operably fixed to the passenger compartment floor with at least a first seat portion of the seat being movable between a compartment lid covering position and a compartment lid exposing position. With the first seat portion in the compartment lid exposing position, the first compartment lid is movable from the closed position to the open position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
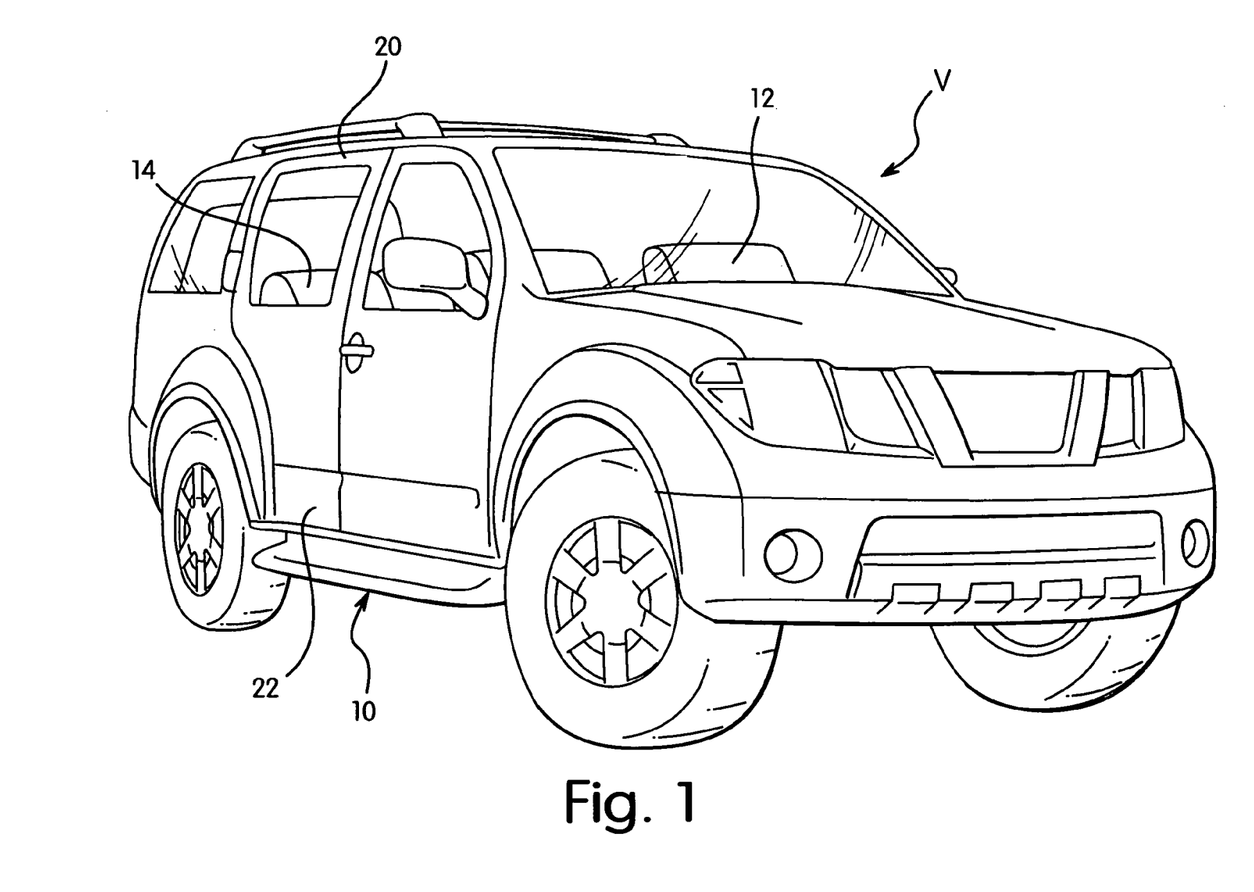
FIG. 1 is a perspective view of a vehicle that includes a vehicle storage structure in accordance with the present invention.
Figure 2:
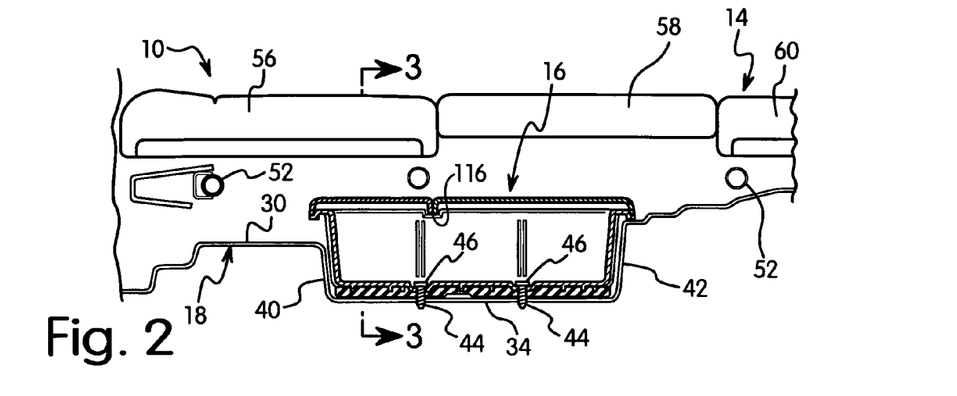
FIG. 2 is a partial cross-sectional view of a storage structure beneath a second row of passenger seats of the vehicle depicted in FIG. 1 in accordance with the present invention.

Referring initially to FIGS. 1 and 2, a vehicle V is illustrated that has a vehicle body structure 10 that can accommodate several rows of passenger seats within the interior of the vehicle V in accordance with a first embodiment of the present invention. The vehicle body structure 10 is equipped with a first row of passenger seats 12 and a second row of passenger seats 14. While the present invention is used with the vehicle body structure 10 that can accommodate several rows of passenger seats, it will be apparent to those skilled in the art from this disclosure that the present invention can be used in a vehicle body structure that has any number of rows of passenger seats with a storage box 16 installed in the area under one of those rows of seats, such as the second row of passenger seats 14 shown in FIG. 2.

Figure 3:
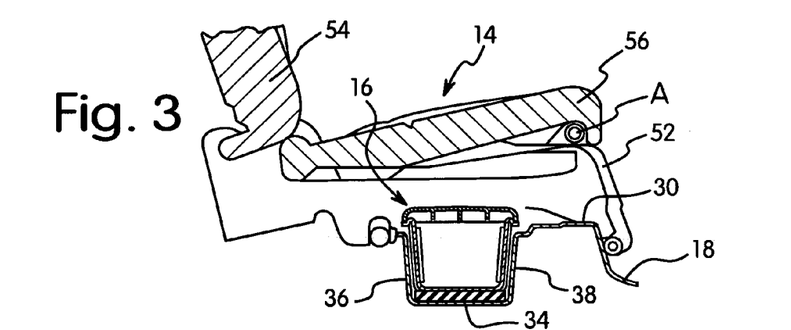
FIG. 3 is a partial cross-sectional side view of the storage structure and passenger seat taken along the section line 3—3 in FIG. 2, showing the passenger seat in a lowered (normal) seating position in accordance with the present invention.
Figure 4:
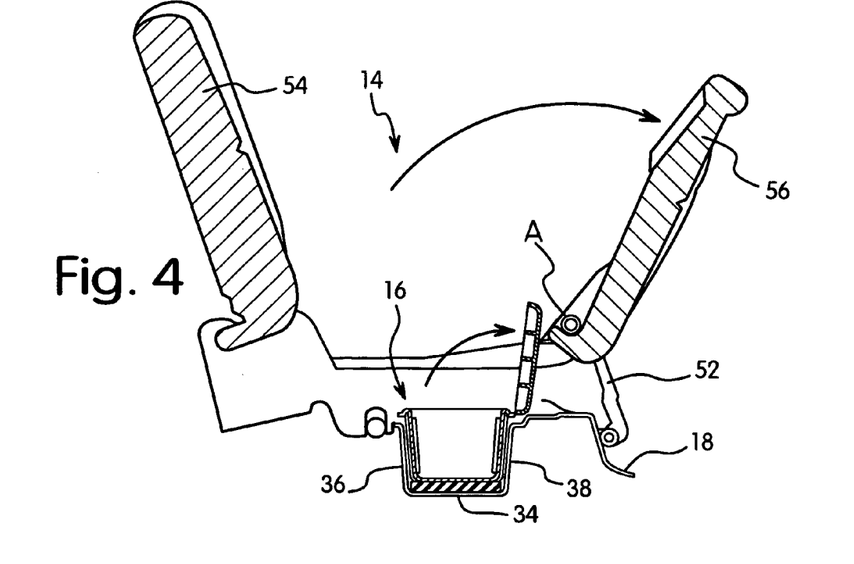
FIG. 4 is another cross-sectional side view of the storage structure and passenger seat similar to FIG. 3, showing the passenger seat in a raised position exposing the storage structure in accordance with the present invention.

In the embodiment illustrated in FIGS. 2, 3 and 4, the storage box 16 is located under the second row of seats 14 within the interior of the vehicle V. The storage box 16 provides additional compartment storage space within the vehicle V without reducing legroom or headroom within the passenger compartment of the vehicle V. Further, since the storage box 16 is installed in the space under a row of passenger seats, the storage box 16 is completely concealed.

The storage box 16 of the present invention is described in greater detail below following a brief description of portions of the vehicle body structure 10. Description of those portions of the vehicle body structure 10, such as suspension and power train elements and structural components well known in the art are omitted for brevity.

Basically, as shown in FIGS. 1–5, the vehicle body structure 10 includes, among other things, a passenger compartment floor 18, a plurality of door openings 20 and a plurality of side doors 22. The passenger compartment floor 18 supports the second row of seats 14 and the storage box 16, as shown in FIGS. 2–4. The second row of seats 14 are configured and arranged to move from a seating position shown in FIGS. 2 and 3 to a raised position shown in FIG. 4. In the raised position, the second row of seats 14 reveal the storage box 16 allowing access to the storage box 16, as described in greater detail below.

The passenger compartment floor 18 is preferably made of stamped or otherwise shaped metal, reinforced steel, composite material or other similar material suitable to provide the structural and dynamic strength necessary for reliable and durable construction of a motorized vehicle. Although not shown, the passenger compartment floor 18 is preferably covered with automotive carpeting or other durable interior flooring material.

Figure 5:
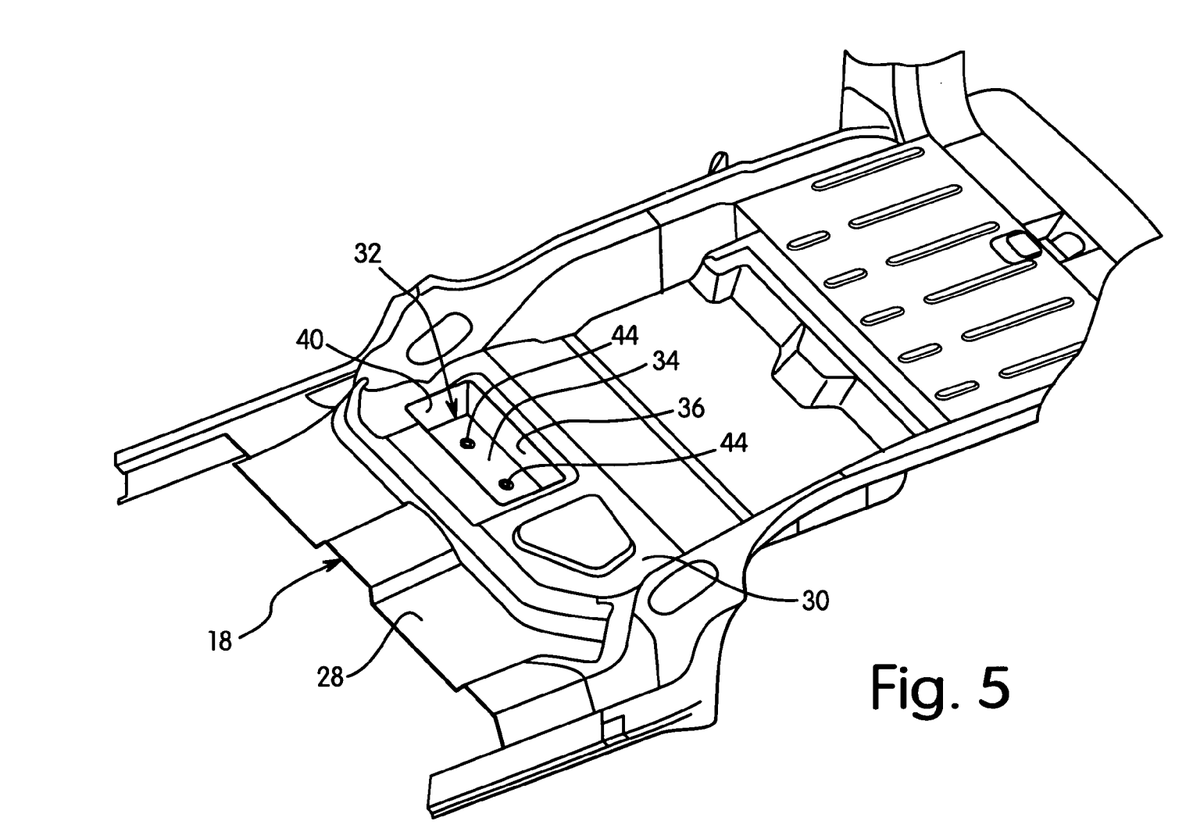
FIG. 5 is a perspective view of the vehicle floor with the passenger seat and the storage box removed for greater clarity.

As shown in FIG. 5 with the passenger seats removed, the passenger compartment floor 18 is formed with a first seat mounting portion (not shown) that receives and supports the first row of seats 12, a second row seating portion 28 and a second seat mounting portion 30 that supports the second row of seats 14.

The second row seating portion 28 is dimensioned to allow foot and leg room for passengers seated in the second row of seats 14. The second seat mounting portion 30 is an area of the passenger compartment floor 18 configured and adapted to receive and non-movably support the second row of seats 14. Specifically, the second seat mounting portion 30 is provided with threaded bolt holes (not shown) or other fastening members for attaching the second row of seats 14 to the passenger compartment floor 18.

The second seat mounting portion 30 is formed with a storage box receiving portion 32. The storage box receiving portion 32 is a cavity or recess that is dimensioned to receive and support the storage box 16. When closed, the second row of seats 14 conceals the storage box 16, as indicated in FIGS. 2 and 3.

As seen in FIGS. 2, 3, 4 and 5, the storage box receiving portion 32 includes a lower wall 34, and four side walls 36, 38, 40 and 42. The lower wall 34 is formed with threaded bolt holes 44 that receive storage box securing fasteners 46, as shown in FIG. 2. It should be understood from the description herein that the storage box receiving portion 32 can alternatively be a flat area under the second row of seats 14. Specifically, the storage box 16 can be installed on a vehicle floor under a row of seats in the absence of a cavity such as the cavity of the storage box receiving portion 32.

With specific reference to FIGS. 2, 3 and 4, the second row of seats 14 basically includes a support structure 52 (only portions of which are shown), a seat back portion 54, a first seating portion 56, a second (center) seating portion 58 and a third seating portion 60. The support structure 52 is fixed to the second seat mounting portion 30 of the passenger compartment floor 18 in a conventional manner, such as using mechanical fasteners or welding techniques. The support structure 52 of the second row of seats 14 can be removably mounted within the vehicle V or can be permanently fixed to the second seat mounting portion 30 of the passenger compartment floor 18. Although not shown, the seat back portion 54 is preferably pivotally supported on the support structure 52 in a conventional manner.

Figure 6:
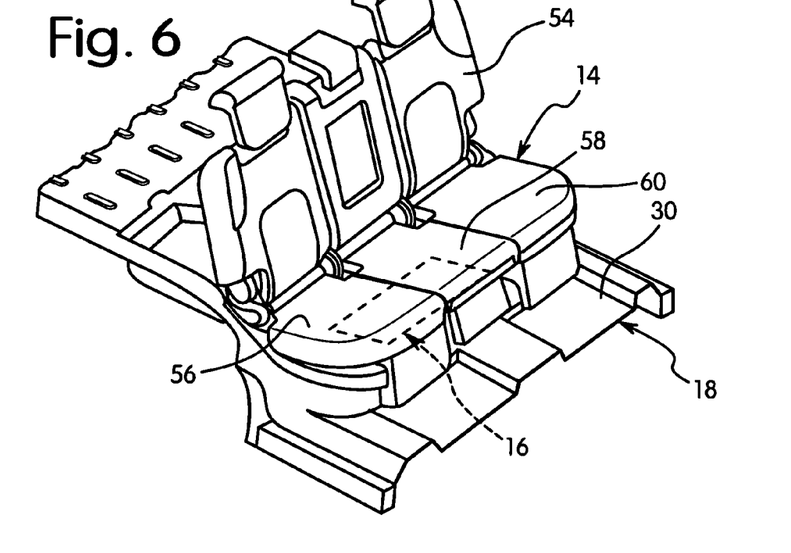
FIG. 6 is a perspective view showing the passenger seat depicted in FIGS. 2–4 in the lowered (normal) seating position concealing the storage structure in accordance with the present invention.
Figure 7:
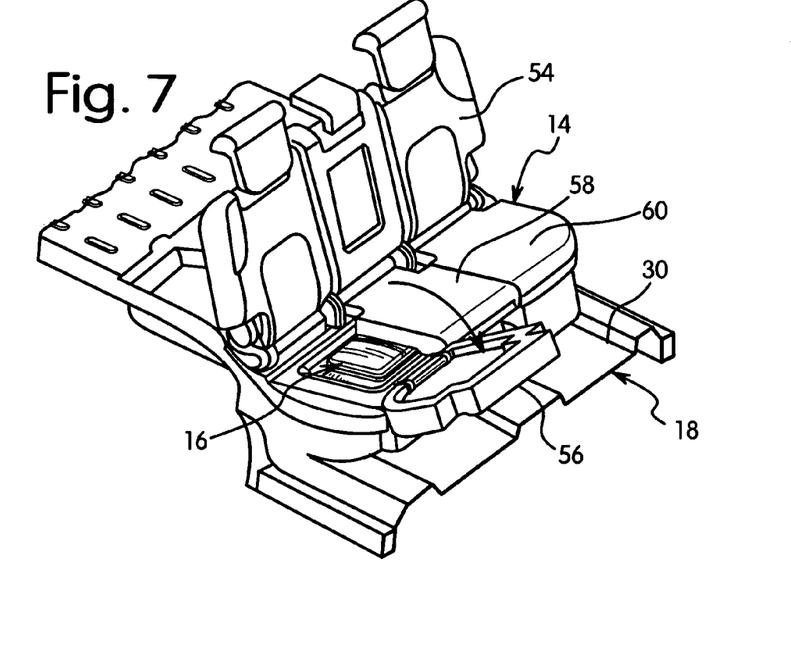
FIG. 7 is another perspective view similar to FIG. 6, showing an outboard portion of the passenger seat in a raised position exposing a first compartment lid of the storage structure, in accordance with the present invention.
Figure 9:
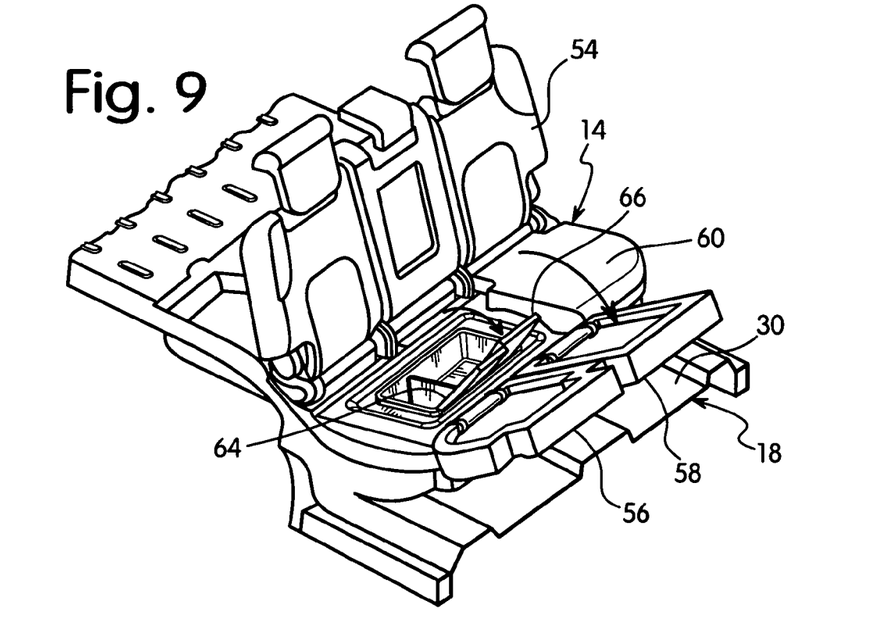
FIG. 9 is another perspective view, similar to FIGS. 6, 7 and 8, showing both the outboard portion and a center portion of the passenger seat in raised positions, and showing both the first compartment lid and a second compartment lid of the storage structure their open positions, in accordance with the present invention.

The first seating portion 56 is likewise pivotally supported on the support structure 52 for pivoting movement between a seating position (FIGS. 2, 3 and 6) and an open position (FIGS. 4 and 7) about a seat pivot axis A. In the open position, the first seating portion 56 exposes a portion of the storage box 16, as shown in FIGS. 4 and 7. The second seating portion 58 is also pivotally supported on the support structure 52 for pivoting movement between a seating position (FIGS. 2, 3 and 6) and an open position (FIG. 9) about the seat pivot axis A. In the open position, the second seating portion 58 exposes a remaining portion of the storage box 16, as shown in FIG. 9. The third seating portion 60 is also supported on the support structure 52 for pivoting movement about the seat pivot axis A. Thus, as seen FIGS. 6 and 7, the first and third seating portions 56 and 60 are outboard seat portions, while the second seating portion 58 is a center or inboard seat portions. The terms "first", "second" and "third" are used herein merely to provide different names to portions of the seat rather than any specific location, shape or part of the seat.

The storage box 16 of the present invention will now be described in greater detail with reference to FIGS. 10–22. The storage box 16 includes a storage structure 62, two pairs of hinges 63, a first compartment lid 64 and a second compartment lid 66. These pieces of the storage box 16 are preferably made of molded plastic material, composite material or other similar material suitable to provide the structural and dynamic strength necessary for reliable and durable construction of a vehicle storage structure.

Figure 8:
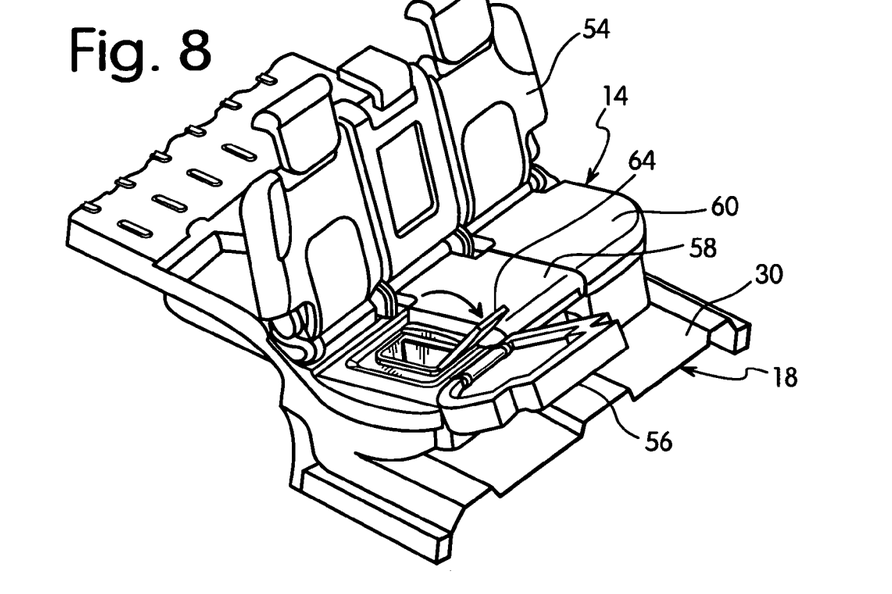
FIG. 8 is another perspective view similar to FIGS. 6 and 7, showing the outboard portion of the passenger seat in the raised position, and showing the first compartment lid of the storage structure an open position, in accordance with the present invention.

As seen in FIGS. 8 and 9, the first compartment lid 64 is accessible by pivoting the seat portion 56 to the opened position, while the second compartment lid 66 is only accessible if both the seat portions 56 and 58 are pivoted to the open position. When the first compartment lid 64 of the storage box 16 is opened, movement of the first seating portion 56 from the opened position to the closed position will result in the first compartment lid 64 of the storage box 16 being moved to its closed position. Similarly, when the first and second compartment lids 64 and 66 of the storage box 16 are opened, movement of the first and second seating portions 58 from their opened positions to the closed position will result in the lids 64 and 66 being moved to their closed position. Consequently, there is no risk of interference between the lids 64 and 66 of the storage box 16 and the movements of the first and second seat portions 56 and 58.

The storage structure 62 of the storage box 16 has a box shape with four generally upright side walls 68, 70, 72 and 74 and a bottom wall 76. The upper edges of the four side walls 68, 70, 72 and 74 form an upper opening 78. The bottom 76 is preferably formed with the four side walls 68, 70, 72 and 74 as a one-piece, unitary member to form an open box shape. An annular rim or lip 88 extends perpendicularly from the side walls 68, 70, 72 and 74 as shown in FIGS. 11 and 15–20.

Figures 10, 11:
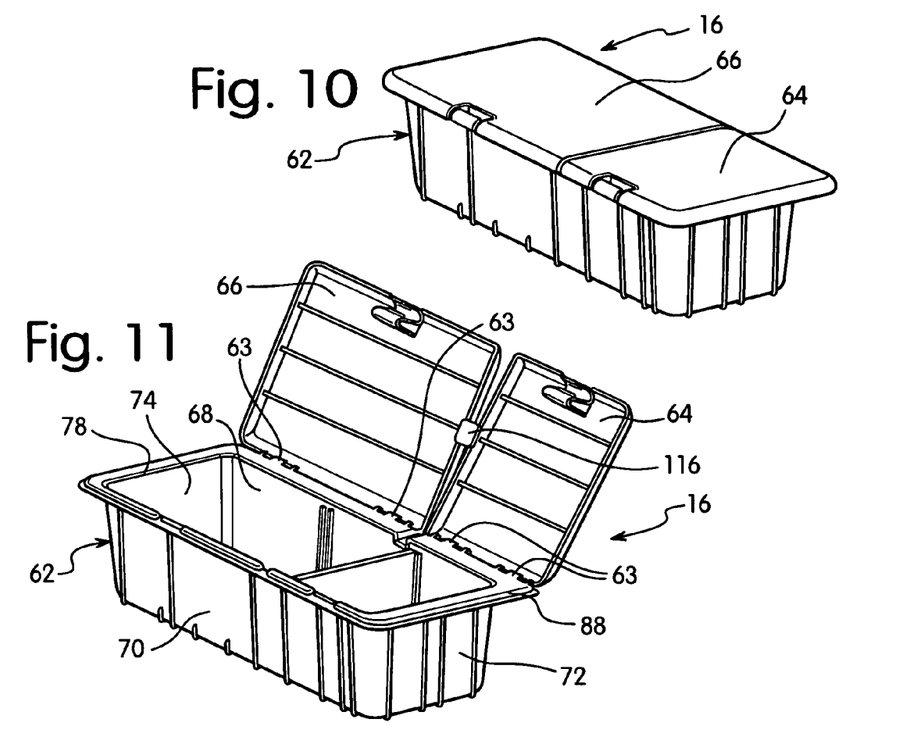
FIG. 10 is a perspective view of a storage box of the vehicle storage structure, shown removed from the vehicle, in accordance with the present invention.
FIG. 11 is another perspective view of the storage box, similar to FIG. 10, with both the first and second compartment lids in their open positions in accordance with the present invention.
Figure 12:
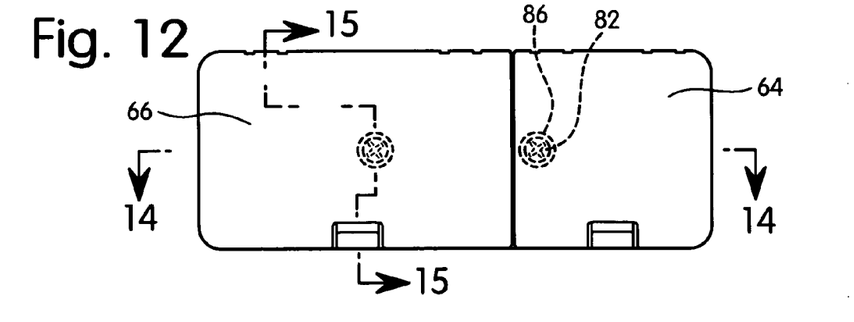
FIG. 12 is a top plan view of the storage box depicted in FIGS. 10 and 11, in accordance with the present invention.
Figure 13:
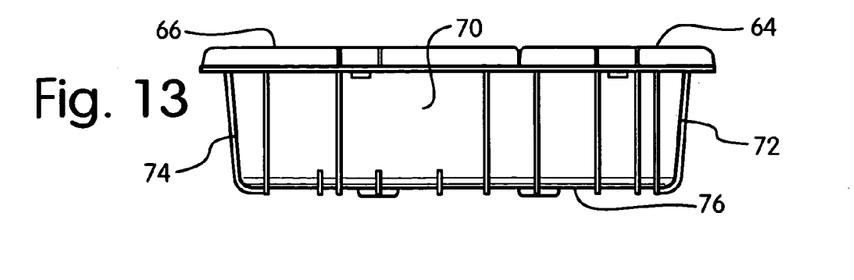
FIG. 13 is a side elevational view of the storage box depicted in FIGS. 10, 11 and 12 in accordance with the present invention.
Figure 14:
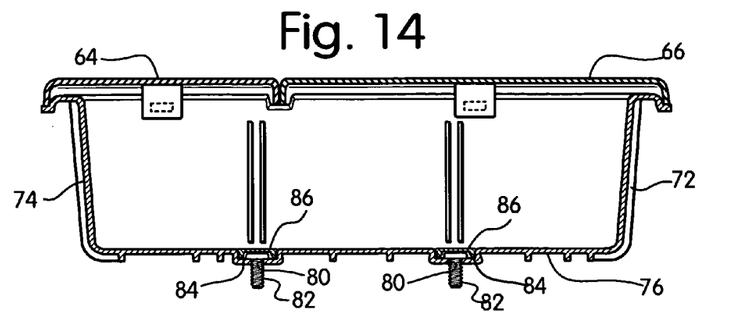
FIG. 14 is a cross-sectional view of the storage box taken along the section line 14—14 in FIG. 12.
Figure 15:
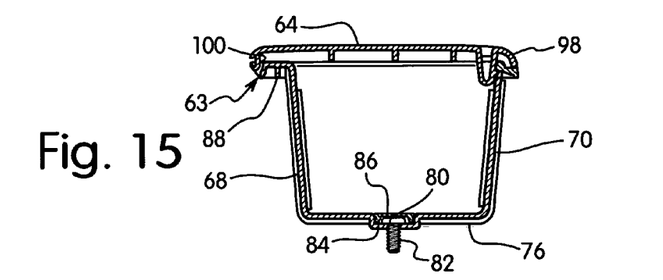
FIG. 15 is a cross-sectional view of the storage box taken along the line 15—15 in FIG. 12, showing one of the compartment lids in the closed position.

The side walls 68 and 70 are also formed with two sets of partition supporting ribs 89. The partition supporting ribs 89 selectively receive a removable divider or partition so that the storage box 16 can be divided into different size sections (FIG. 11). While only one divider is shown, it will be apparent from this disclosure that two dividers can be used at once to divide the storage box 16 into three sections as needed and/or desired. Preferably, one of the sets of partition supporting ribs 89 is located near to interface between the lids 64 and 66 of the storage box 16 so that the area of the storage box 16 is divided into two sections that generally correspond to the size of the lids 64 and 66. While only two sets of partition supporting ribs 89 are shown, it will be apparent from this disclosure that the side walls 68 and 70 can be formed with additional partition supporting ribs 89 to divide the area of the storage box 16 into smaller sections as needed and/or desired.

Figures 18, 19, 20:
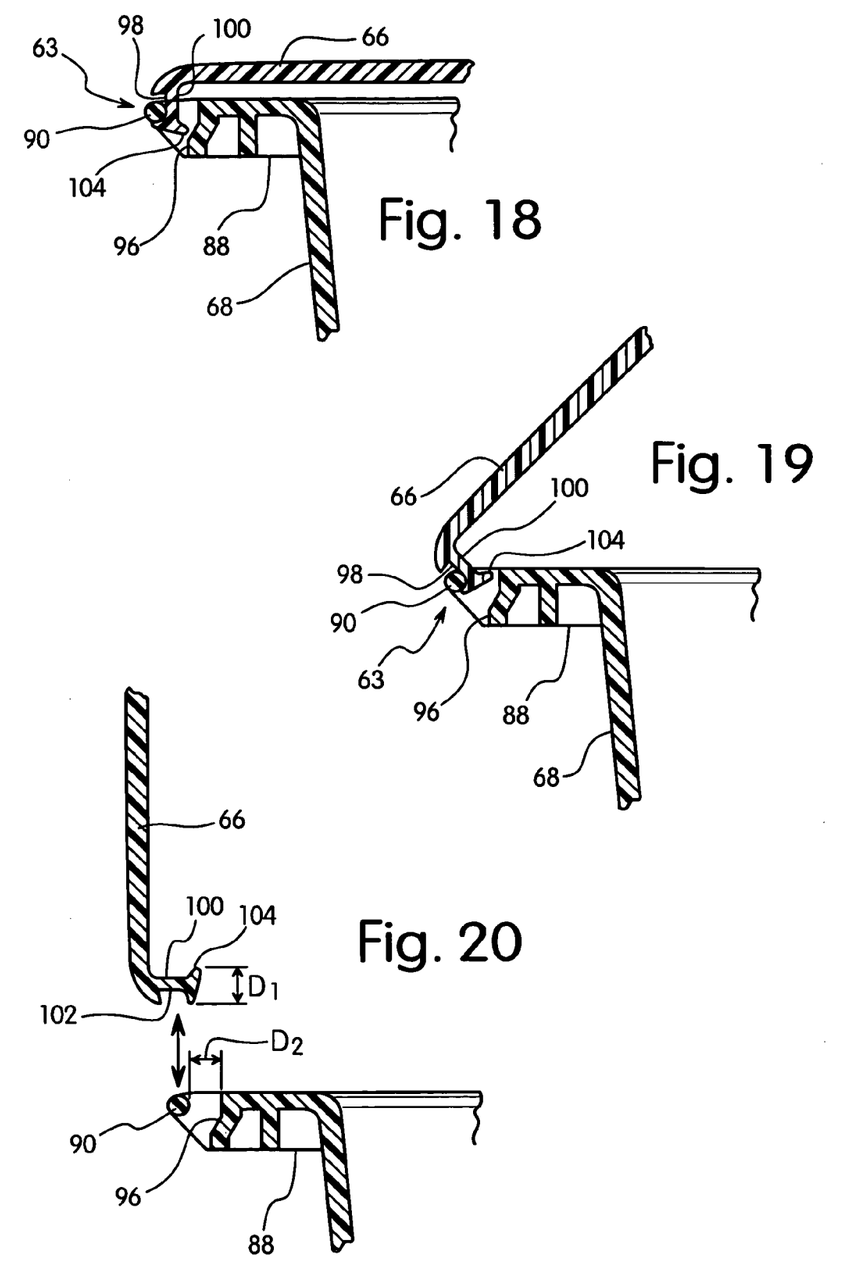
FIG. 18 is a fragmentary cross-sectional view of a hinge portion of the storage box shown in FIGS. 16 and 17, with the compartment lid closed.
FIG. 19 is another is a fragmentary cross-sectional view of the hinge portion of the storage box similar to FIG. 18, with the compartment lid opened and in position for removal from the storage box.
FIG. 20 is another is a fragmentary cross-sectional view of the hinge portion of the storage box similar to FIGS. 18 and 19.

As should be clear from the drawings and the description herein, the hinges 63 are partially formed by the rim 88 and portions of the first and second compartment lids 64 and 66. In particular, the rim 88 is formed with a four pivot pins 90, one for each of the four hinges 63. The pivot pins 90 pivotally support the first and second compartment lids 64 and 66 as shown in FIGS. 16, 18, 19 and 20. The pivot pins 90 define a seat pivot axis. The rim 88 is also formed with a plurality of movement restricting surface 96, with one of the movement restricting surface 96 being located adjacent to one of the pivot pins 90. The movement restricting surfaces 96 are spaced apart from the pivot pins 90 by a distance $D_1$, as shown in FIG. 20. The movement restricting surfaces 96 extend along the length of the pivot pins 90 and are generally parallel to the pivot pins 90. Operation of the hinges 63 is explained more fully below in the description of the lid portion of the hinges 63.

Figure 21:
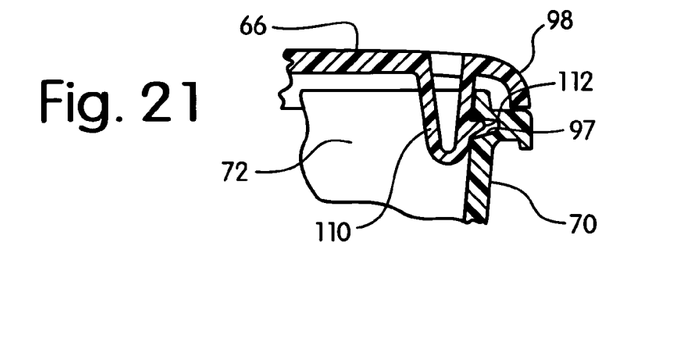
FIG. 21 is a fragmentary cross-sectional view of a latch portion of the storage box shown in FIGS. 16 and 17, with the compartment lid closed and the latch engaged.
Figure 22:
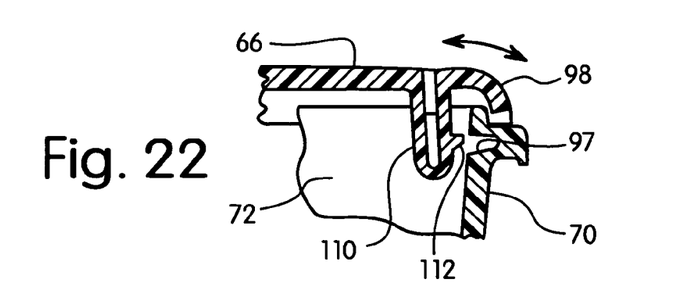
FIG. 22 is another fragmentary cross-sectional view of the latch portion of the storage box similar to FIG. 21, with the compartment lid closed and the latch disengaged.
Figure 23:
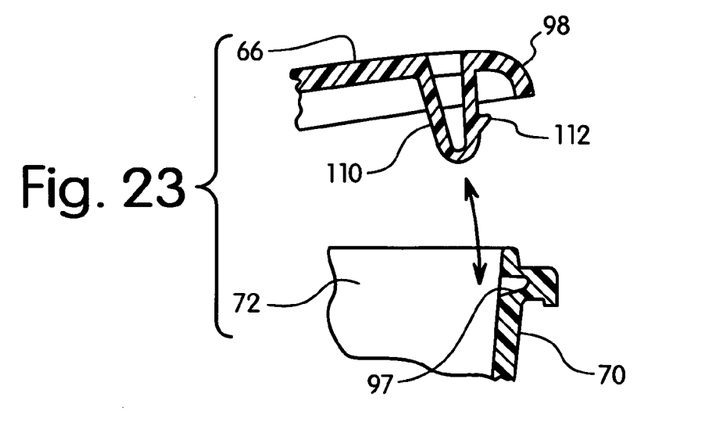
FIG. 23 is another fragmentary cross-sectional view of the latch portion of the storage box similar to FIGS. 21 and 22, with the compartment lid opened.

As shown in FIGS. 21, 22 and 23, the side wall 70 of the storage structure 62 is formed with a pair of latch recesses 97. The latch recesses 97 cooperate with the lids 66 and 64 to releasably lock the lids 66 and 64 in their closed positions as discussed below.

Figure 16:
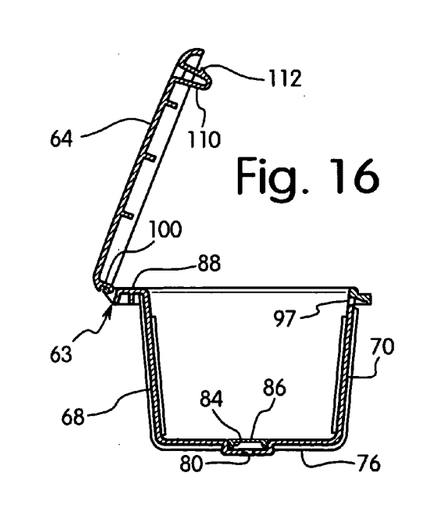
FIG. 16 is another cross-sectional side view of the storage box, similar to FIG. 15, showing one of the compartment lids in the open position.
Figure 17:
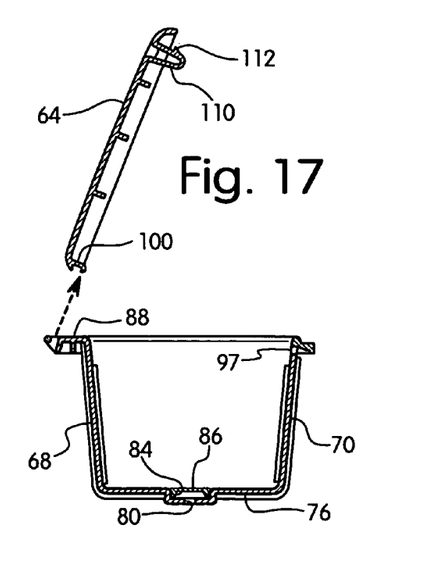
FIG. 17 is another cross-sectional side view of the storage box, similar to FIGS. 15 and 16, showing one of the compartment lids being removed.

The bottom wall 76 of the storage structure 62 includes at least two bolt holes 80 (see FIGS. 14, 15, 16 and 17) that receive the fasteners 46 for securing the storage box 16 in the storage box receiving portion 32 (see FIG. 2). The bottom wall 76 is also formed with at least two recesses 84 (FIGS. 14, 15, 16 and 17) that are concentric with the bolt holes 80. The recesses 84 are dimensioned to receive fastener covers 86 that conceal the fasteners 46. Once installed in the recesses 84, the fastener covers 86 are flush with the upper surface of the bottom wall 76 as shown in FIGS. 16 and 17.

Description of the first and second compartment lids 64 and 66 will now be provided. The first and second compartment lids 64 and 66 are preferably each formed as a one-piece, unitary member from a plastic, composite or polymer material suitable for automotive applications. The first and second compartment lids 64 and 66 are structurally the similar, except that the second compartment lid 66 is larger than the first compartment lid 64 and has an additional feature described below. The following description of features of the first lid compartment 64 is applicable to the second compartment lid 66, since the two lids share the following described features.

The first compartment lid 64 is formed with portions of the two hinges 63 (FIG. 11) and a latch handle 98. Since the two hinges 63 of the first compartment lid 64 are generally identical, only the lid portion of one hinge 63 is described. Specifically, for each hinge 63 of the first compartment lid 64 is formed with a hinge protrusion 100 shown in FIGS. 16, 17, 18, 19 and 20. As shown in FIGS. 18, 19 and 20, the hinge protrusion 100 includes a contact surface 102 and a movement restriction projection 104. A distal end of the contact surface 102 has an arcuate shape that conforms to the outer circumference of the pivot pin 90. Hence, the contact surface 102 serves as a bearing surface that movably engages the pivot pin 90. The movement restriction projection 104 extends in a direction away from the contact surface 102 toward the movement restriction surface 96. Specifically, the movement restriction projection 104 has a length $D_2$, as shown in FIG. 20. The length $D_2$ as greater than the distance $D_1$. Therefore, with the first compartment lid 64 in the closed position (FIG. 18), the movement restriction projection 104 is confined between the pivot pin 90 and the movement restricting surface 96. Hence, the first compartment lid 64 is refrained against upward movement when the first compartment lid 64 is in a closed position, or in an intermediate position.

As shown in FIG. 19, as the compartment lid 64 rotates upward from the closed position to an intermediate position, the movement restriction projection 104 moves to a position free of the confines of the movement restricting surface 96. As shown in FIG. 20, with the first compartment lid 64 rotated to the upright or opened position, the first compartment lid 64 can be removed from the storage box 16. By reversing the above steps, the first compartment lid 64 can be re-installed on the storage box 16.

Referring now to FIGS. 21, 22 and 23, the latch handle 98 is now described in greater detail. The latch handle 98 includes a U-shaped flexible portion 110. The flexible portion 110 is formed with a protrusion 112. The latch handle 98 is unitarily formed with the first compartment lid 64. Since the first compartment lid 64 is preferably made of a plastic material, the flexible portion 110 elastically deforms to move the protrusion 112 in and out of the latch recess 97. With the first compartment lid 64 in the closed position (FIG. 21), applying pressure on the latch handle 98 pushes the protrusion 112 out of the latch recess 97 (FIG. 22) and the first compartment lid 64 can be opened (FIG. 23).

Referring again to FIG. 11, an additional feature of the second compartment lid 66 will now be described. The second compartment lid 66 can be formed with an optional projection 116 that serves as a lid coupling portion. The projection 116 is rigidly and non-movably fixed to the second compartment lid 66 extending toward and under the first compartment lid 64. The projection 116 is configured and arranged to contact and engage the underside of the first compartment lid 64 when both first and second compartment lids 64 and 66 are in the same position. For example, when both first and second compartment lids 64 and 66 are in the closed positions (FIG. 10) the projection 116 extends under the first compartment lid 64. If the second compartment lid 66 is lifted up toward the open position, the projection 116 lifts the first compartment lid 64 up in concert with the second compartment lid 66. Similarly, if both the first and second compartment lids 64 and 66 are in the open position (FIG. 11) and only the first compartment lid 64 is pushed toward the closed position, the projection 116 is contacted by the first compartment lid 64 and the second compartment lid 66 is closed with the first compartment lid 64. However, with both first and second compartment lids 64 and 66 in the closed position, if the first compartment lid 64 is lifted from the closed position, the second compartment lid 66 remains in the closed position. As should be apparent from the description and the drawings, the second compartment lid 66 cannot be opened without also opening the first compartment lid 64 due to the contact with the projection 116.

As shown in FIG. 2, the dimensions of the first and second compartment lids 64 and 66 are such that with the first seating portion 56 lifted, only the first compartment lid 64 can be opened. Specifically, the first compartment lid 64 is completely under the first seating portion 56. The second compartment lid 66 is under the second seating portion 58 but has a small portion that extends under the first seating portion. Therefore, with only the second seating portion 58 in the open position, neither of the first and second compartment lids 64 and 66 can be opened since the first seat portion 56 interferes with the opening of the second compartment lid 66. Hence, the projection 116 is advantageous in preventing a passenger from attempting to open the second compartment lid 66 with only the second seating portion 58 in the open position.

Second Embodiment

Figure 24:
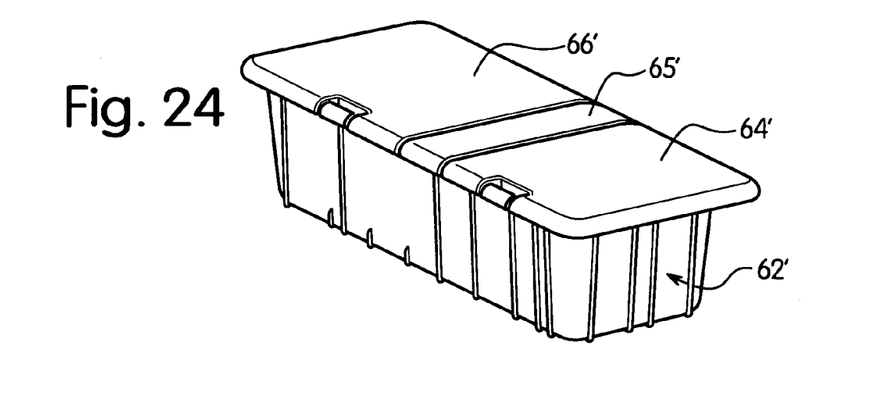
FIG. 24 is a perspective view of a storage box in accordance with a second embodiment of the present invention.
Figure 25:
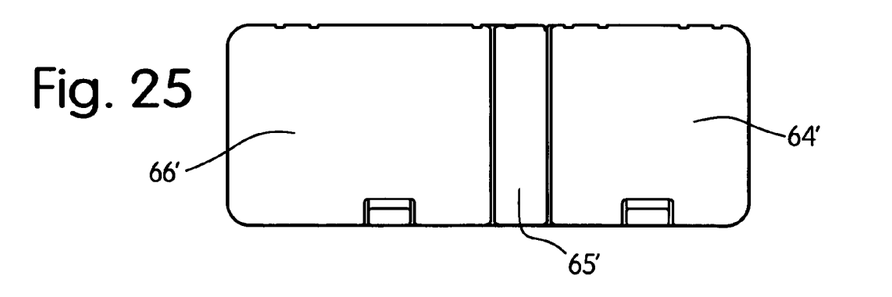
FIG. 25 is a top view of the storage box depicted in FIG. 24 in accordance with the second embodiment of the present invention.
Figure 26:
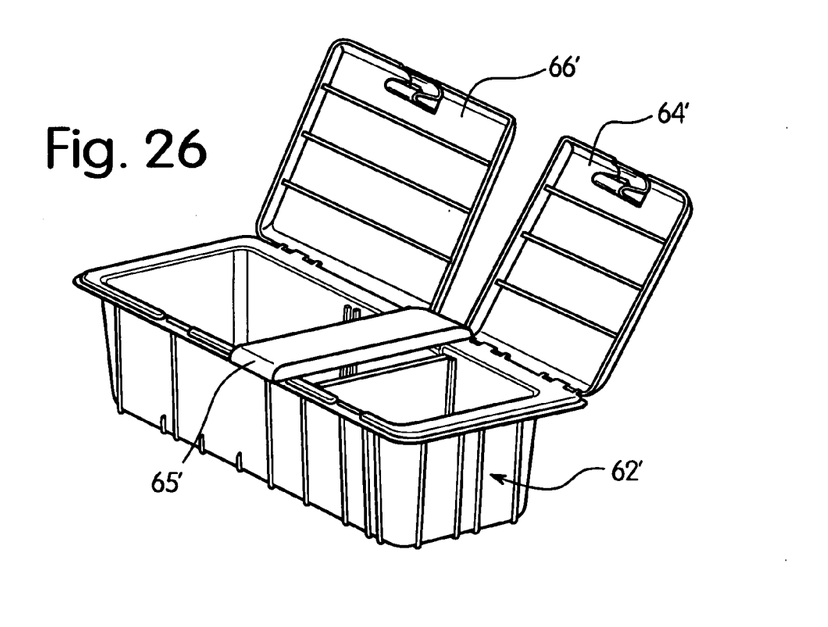
FIG. 26 is another perspective view of the storage box depicted in FIG. 24, showing the compartment lids in an open position in accordance with the second embodiment of the present invention.

Referring now to FIGS. 24, 25 and 26, a storage box 16' is shown in accordance with a second embodiment that will now be explained. In view of the similarity between the first and second embodiments, the descriptions of the parts of the second embodiment that are substantially identical to the parts of the first embodiment may be omitted for the sake of brevity.

It should be understood from the drawings and description herein that the storage box 16' is interchangeable with the storage box 16 of the first embodiment. Specifically, the storage box 16' of the second embodiment can be installed under the passenger seat 12 of the vehicle V, as described above with respect to the first embodiment.

The storage box 16' includes a storage structure 62', a first compartment lid 64', a spacer lid 65' and a second compartment lid 66'. The storage structure 62' is generally identical to the storage structure 62 of the first embodiment, except that the storage structure 62' has been modified to accommodate the spacer lid 65'. In other words, the hinges of the storage box 16' have changed slightly to accommodate the smaller second compartment lid 66'.

The spacer lid 65' is fixed to the storage structure 62' and is preferably not easily removed from the storage structure 62'. The first compartment lid 64 is identical in structure and function to the first embodiment. The second compartment lid 66' is smaller that the second compartment lid 66' due to the inclusion of the spacer lid 65'. Further, the second compartment lid 66' does not have the projection 116 of the second compartment lid 66 of the first embodiment. Accordingly, the second compartment lid 66' can be opened when the second seat portion 58 is lifted to its upright position. Specifically, the second compartment lid 66' lies completely under the second seat portion 58 when the storage box 16' is installed in the storage box receiving portion 32. Thus, the first seat portion 56 does not interfere with the opening and closing of the second compartment lid 66'.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle storage structure comprising:
a passenger compartment floor being configured to form a recessed storage box receiving portion having a vertically extending forward side wall a vertically extending rearward side wall and a bottom wall extending between the forward and rearward side walls;
a storage structure at least partially disposed within the recessed storage box receiving portion and secured to the passenger compartment floor;
at least a first compartment lid movably supported on the storage structure to move between an open position and a closed position; and
a seat operably fixed to the passenger compartment floor with at least a first seat portion of the seat being movable between a compartment lid covering position and a compartment lid exposing position in which the first compartment lid is movable from the closed position to the open position when the first seat portion is in the compartment lid exposing position.

2. The vehicle storage structure as set forth in claim 1, wherein
the first compartment lid is pivotally coupled to the storage structure along a lid pivot axis, and
the first seat portion is pivotally coupled relative to the passenger compartment floor along a seat pivot axis that is generally parallel to the lid pivot axis of the first compartment lid with the lid pivot axis being disposed at a level below the seat pivot axis as measured in a vertical direction relative to the passenger compartment floor.

3. The vehicle storage structure as set forth in claim 1, wherein
the storage structure includes at least one removable divider for partitioning the storage compartment into smaller storage spaces.

4. The vehicle storage structure as set forth in claim 1, wherein
the storage structure is removably fixed to the passenger compartment floor by a plurality of removable fasteners.

5. The vehicle storage structure as set forth in claim 1, further comprising
a second compartment lid moveably supported on the storage structure to move between an open position and a closed position.

6. The vehicle storage structure as set forth in claim 5, wherein
the first compartment lid is smaller than the second compartment lid with the first compartment lid including a lid latching structure that releasably engages a storage structure box latching structure of the storage structure by elastically deforming, the first and second compartment lids are selectively interconnected by a lid coupling portion such that opening the second compartment lid opens the first compartment lid in concert with the second compartment lid.

7. The vehicle storage structure as set forth in claim 6, wherein
the lid coupling portion includes an extension member extending laterally between adjacent ends of the first and second compartment lids such that the extension member engages the first and second compartment lids in response to opening the second compartment lid for movement therewith.

8. The vehicle storage structure as set forth in claim 7, wherein
the first compartment lid is position outboard of the second compartment lid relative to the passenger compartment floor.

9. The vehicle storage structure as set forth in claim 5, wherein
the storage structure includes an open ended box, a box latching structure and a box pivot structure that are integrally formed as a one-piece, unitary member, and
the first and second compartment lids includes a lid latching structure and a lid pivot structure that are integrally formed as a one-piece, unitary member.

10. The vehicle storage structure as set forth in claim 5, wherein
the seat includes a second seat portion movable between a compartment lid covering position and a compartment lid exposing position with the first seat portion being arranged to cover at least a portion of the first compartment lid when the first seat portion is in its compartment lid covering position, and the second seat portion being arranged to cover at least a portion of the second compartment lid when the second seat portion is in its compartment lid covering position, the second compartment lid being movable from the closed position to the open position when only both first and second seat portions are in their respective compartment lid exposing positions.

11. The vehicle storage structure as set forth in claim 10, wherein
the first seat portion is arranged to completely cover the first compartment lid when the first seat portion is in its compartment lid covering position such that the first compartment lid is exposed and free to open when the first seat portion is in its compartment lid exposing position and the second seat portion is in its compartment lid covering position.

12. The vehicle storage structure as set forth in claim 10, wherein
the seat is configured and arranged such that the first compartment lid is exposed and free to open when the first seat portion is in its compartment lid exposing position, and the second compartment lid is prevented from opening when the first seat portion is in its compartment lid covering position.

13. The vehicle storage structure as set forth in claim 10, wherein
the first seat portion is arranged to cover the first compartment lid such that the first compartment lid is completely exposed to be opened when the first seat portion is in its compartment lid exposing position and the second seat portion is in its compartment lid covering position.

14. The vehicle storage structure as set forth in claim 5, further comprising
a compartment spacer lid disposed between the first and second compartment lids to cover a central portion of the storage structure.

15. A vehicle storage structure, comprising:
a passenger compartment floor;
a storage structure secured to the passenger compartment floor;

a first compartment lid movably supported on the storage structure to move between an open position and a closed position;

a second compartment lid moveably supported on the storage structure to move between an open position and a closed position; and a seat operably fixed to the passenger compartment floor including a first seat portion movable between a compartment lid covering position and a compartment lid exposing position, and a second seat portion movable between a compartment lid covering position and a compartment lid exposing position with the first seat portion being arranged to cover at least a portion of the first compartment lid when the first seat portion is in its compartment lid covering position, and the second seat portion being arranged to cover at least a portion of the second compartment lid when the second seat portion is in its compartment lid covering position, the second compartment lid being movable from the closed position to the open position only when both the first and second seat portions are in the compartment lid exposing positions, respectively.

16. The vehicle storage structure as set forth in claim 15, wherein
the first seat portion is arranged to completely cover the first compartment lid when the first seat portion is in its compartment lid covering position such that the first compartment lid is exposed and free to open when the first seat portion is in its compartment lid exposing position and the second seat portion is in its compartment lid covering position.

17. The vehicle storage structure as set forth in claim 15, wherein
the first and second compartment lids are selectively interconnected by a lid coupling portion such that opening the second compartment lid opens the first compartment lid in concert with the second compartment lid.

18. A vehicle storage structure comprising:
a passenger compartment floor;
a storage structure secured to the passenger compartment floor;
at least a first compartment lid pivotally coupled to the storage structure to move between an open position and a closed position about a lid pivot axis; and a seat operably fixed to the passenger compartment floor with at least a first seat portion of the seat being pivotally coupled to the passenger compartment floor to move between a compartment lid covering position and a compartment lid exposing position about a seat pivot axis in which the first compartment lid is movable from the closed position to the open position when the first seat portion is in the compartment lid exposing position, and the lid pivot axis is located vertically lower than the seat pivot axis such that a horizontal gap is formed above the first compartment lid and below a horizontal plane passing through the seat pivot axis with the horizontal gap extending from a front edge of the first compartment lid to a rear edge of the first compartment lid.

19. The vehicle storage structure as set forth in claim 18, wherein
the passenger compartment floor is configured to form a recessed storage box receiving portion having a vertically extending forward side wall, a vertically extending rearward side wall and a bottom wall extending between the forward and rearward side walls, and
the storage structure is at least partially disposed within the recessed storage box receiving portion.

20. The vehicle storage structure as set forth in claim 18, further comprising
a second compartment lid moveably supported on the storage structure to move between an open position and a closed position.

21. The vehicle storage structure as set forth in claim 20, wherein
the second compartment lid is movable from the closed position to the open position when both first and second seat portions are in compartment lid exposing positions, respectively, and the second compartment lid is prevented from opening with either one of the first and second seat portions is in one of the compartment lid exposing positions, respectively.

* * * * *